Feb. 21, 1933.    J. FLAMMANG ET AL    1,898,296
TRUNK PISTON
Filed Feb. 18, 1929
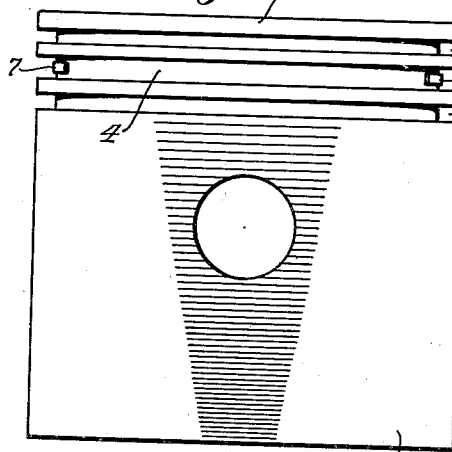
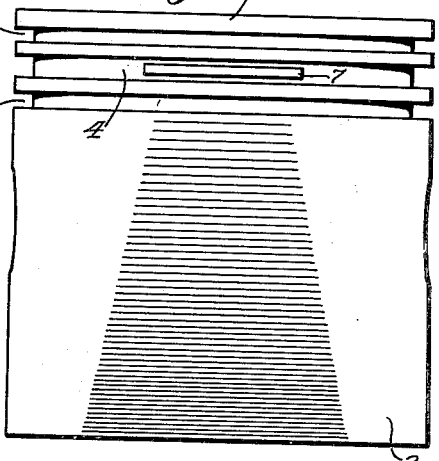
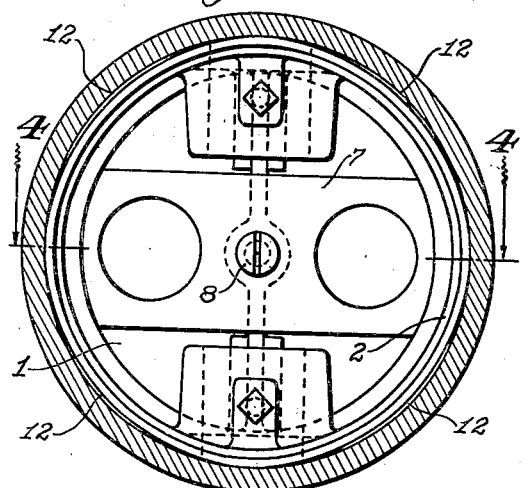
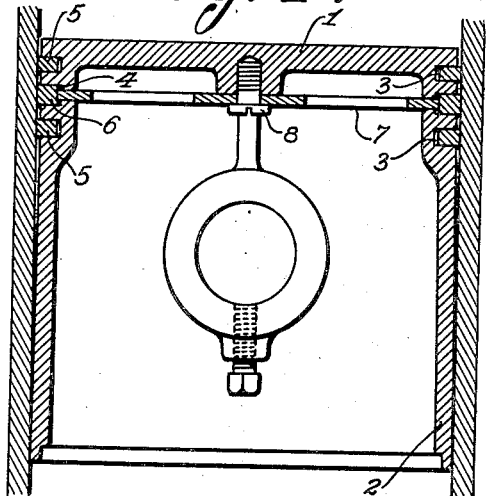
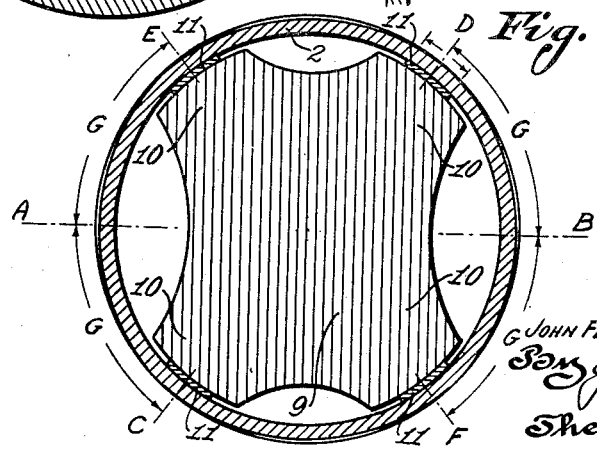
Inventors:
John Flammang and Percy L. Bowser,
By John N. Bruninga
Their Attorney.

Patented Feb. 21, 1933

1,898,296

UNITED STATES PATENT OFFICE

JOHN FLAMMANG, OF UNIVERSITY CITY, AND PERCY L. BOWSER, OF ST. LOUIS, MISSOURI, ASSIGNORS TO THE STERLING CORPORATION, OF WILMINGTON, DELAWARE, A CORPORATION OF DELAWARE

TRUNK PISTON

Application filed February 18, 1929. Serial No. 340,823.

This invention relates to trunk pistons, such as are used in internal combustion engines. More particularly this invention pertains to that type of pistons in the design of which an attempt is made to save power by constructing the piston of a light material such as aluminum or its alloys.

It is, of course, well known that difficulty is experienced in the use of so-called aluminum pistons—that is, pistons made of aluminum or its alloys—on account of the fact that the rate of thermal expansion of aluminum is so much greater than that of cast iron, of which cylinders are ordinarily constructed, that an aluminum piston is almost certain to bind in the cylinder unless constructed with excessive clearance when cold or provided with ways of making the skirt resilient so as to give under expansion.

One of the objects of this invention is to provide a so-called aluminum piston of improved design so constructed as to have a good bearing in the cylinder at minimum operating temperature as well as a maximum operating temperature, and at the same time to be free of any danger of seizing or sticking in the cylinder.

Another object is to provide a piston having a skirt of special form so as to have a good bearing at all temperatures and still allow clearance to take care of expansion.

Some attempts have been made to overcome the difficulties due to excessive expansion by splitting the piston skirt so that it may yield. This renders the piston unstable and liable to warp out of shape in use. Other attempts have been made to form the skirt of the piston to oval or elliptical shape, so as to be free of the cylinder at the ends of the wrist pin axis, while contacting therewith at the ends of the thrust axis. Such a piston provides a good bearing in the direction of the thrust, but it is without support in the direction of the wrist pin axis, so that there is still liability of oscillation of the piston, causing piston slap.

Another object of this invention, therefore, is to provide a piston so formed as to have a good bearing on the cylinder wall, both at the ends of the thrust axis and at the ends of the wrist pin axis, while at the same time allowing clearance to be taken up by expansion. Such a piston will not oscillate, but will be perfectly steady in the cylinder at all temperatures.

Another object is to provide such a piston in which provision is made for supporting the head portion of the piston in such a manner as to have a good bearing at all temperatures and also to form the skirt so as to bear against the cylinder at the ends of both the thrust axis and the wrist pin axis and still allow clearance for expansion.

Further objects will appear from the following description, taken in connection with the accompanying drawing, in which—

Figure 1 is a side view of a piston embodying this invention, taken in the direction of the wrist pin axis;

Figure 2 is a similar view, taken in the direction of the thrust axis or at right angles to the direction of Figure 1;

Figure 3 is a bottom view of the piston with the cylinder shown in section;

Figure 4 is a section on line 4—4 of Figure 3; and

Figure 5 is a transverse section, taken through the piston skirt near the end thereof, showing the manner of mounting the piston for machining the same.

Referring to the drawing, the piston comprises a head portion 1 and a skirt 2. The head portion 1 is provided with the usual packing ring grooves 3, of which two are shown in the drawing, though any other number may be used. Another groove 4 is provided in the head portion 1, which is similar in all respects to the grooves 3; however, in the embodiment shown it is somewhat wider. The packing ring grooves 3 are adapted to receive packing rings 5 of any suitable type, while the groove 4 is adapted to receive a bearing ring 6, which may be constructed in all respects similar to the rings 5, although its dimensions may be different; it may, however, perform the function of a packing as well as a bearing ring.

Mounted in the head portion of the piston is an abutment 7. In the case illustrated, this takes the form of a flat plate or bar secured at 8 in any suitable manner to the piston head and extending through slots in the piston wall so that its ends project into the groove 4 from the bottom thereof. The outside or projecting edge of this abutment is machined to such a diameter that the ring 6, when resting upon it in the groove 4 but free of the groove bottom, will have a good bearing on the cylinder wall. The abutment 7 is constructed of steel or other suitable material having a rate of thermal expansion substantially equal to that of the cylinder. Being secured at 8 to the piston head and free to move relatively to the piston at its ends, this abutment will maintain the ring 6 in normal contact with the cylinder wall at all times. The piston head being secured to the abutment 7, will be sustained thereby in a constant position in the cylinder at all temperatures. It will be clear, therefore, that looseness or oscillation of the head portion of the piston is effectively prevented.

The skirt portion of the piston is formed so that its dimensions along the thrust and wrist pin axes are such as to contact properly with the cylinder wall. The intermediate portions of the skirt, however, between such axes are diametrically reduced so as to be clear of the cylinder wall. Such clearance is provided in order that during the growth of the circumferential dimensions of the skirt during expansion, this clearance will be taken up to a greater or less extent, according to the rise in temperature.

The forming of the skirt to the above described shape may be conveniently carried out in the following manner: The skirt is mounted in a lathe with the head portion centered in any well known manner, while the open end of the skirt is mounted on a jig 9, as shown in Figure 5. The jig 9 is machined to suitable dimensions and is provided with four abutments 10 angularly displaced from one another, as shown. In Figure 5, the line AB represents the thrust axis. The abutments 10 are arranged on axes CD and EF, both of which are angularly displaced from the axis AB. The angles G, which these axes make with AB, are not 45°, but somewhat greater, so that the axes CD and EF are unequally spaced from the wrist pin and thrust axes, being nearer the wrist pin axis, as the skirt is stiffer at this point.

Shims 11 of suitable thickness are then placed upon the abutments 10, and the skirt 2 is forced over the jig and over the shims 11. This distorts the skirt so that it is no longer round, but approaches slightly a squared form. The thickness of the shims 11 may be adjusted so as to provide any degree of distortion desired. In practice it has been found that, for pistons of ordinary size of about 3.750 inches diameter, shims of a thickness of about .020 of an inch give good results. The piston is thus strained out of its normal shape, and in this strained condition, it is turned in the lathe to a circular contour, and at the same time the piston is slightly flared toward the open end of the skirt—that is, the diameter gradually reduces from the open end toward the head end. The extent of this flare may be adjusted as desired, being ordinarily only a few thousandths of an inch.

After thus machining the piston, it is removed from the jig 9, whereupon the skirt springs back under its own resiliency nearly to its previous form. On account of the machining under distortion, however, the piston now has a form such that its greatest diameters are in line with the thrust and wrist pin axes, while the parts of the skirt between these axes are diametrically reduced, so as to clear the cylinder at minimum temperatures by a certain amount. The machining dimensions may be so adjusted that the diameters along the thrust and wrist pin axes are such as to fit the cylinder snugly so that the piston must be tapped into place in the cylinder. A piston of this form has a very good bearing on the cylinder wall at four places. These places are at the ends of the thrust and wrist pin axes and extend practically entire length of the skirt. While the skirt has a good bearing at these points, it is clear of the cylinder wall at intermediate points, as indicated at 12, Figure 3; although, of course, this clearance is small.

It will be seen that this invention provides a piston which may be made of a light material, such as aluminum alloy and which may be formed so as not only to provide a good bearing in the cylinder at all temperatures, but to make ample allowance for the high rate of expansion of this material relatively to that of the cylinder. The head portion of the piston is sustained by the abutment 7, while the skirt makes a good bearing contact at four points about its circumference. The construction is such that as the temperature increases, the intermediate portions of the skirt between the bearing points are forced outwardly closer to the cylinder wall. Accordingly, the area of contact at the bearing points increases as the temperature increases. At a certain temperature the area of contact at one end of the thrust axis will be as indicated by the shaded area in Figure 2. At the same time, the area of contact at an end of the wrist pin axis will be as indicated by the shaded area in Figure 1. As the piston expands, these areas will both grow and approach each other until at maximum working temperature practically the entire area of the piston skirt will contact with the cylinder wall.

It will be understood, of course, that the piston is cooled by transmitting its heat to the cylinder wall to be dissipated by the cooling water. The rate of such dissipation will, of course, depend upon the area of contact between piston and cylinder. It will be seen, therefore, that since these areas of contact increase with rise of temperature, as just pointed out, the rate at which heat may be carried away from the piston will also increase, on account of the increased area of contact with the cylinder. It will be clear, therefore, that as the temperature of the piston increases, the facilities for dissipating heat will also be increased. This feature has a tendency to check excessive rise of piston temperature. It has, in fact, been found in practice that a certain maximum temperature seems to be impossible to exceed, and the piston is so designed that at such temperature practically the entire piston skirt contacts with the cylinder wall.

While this invention is directed more particularly to the type of piston described, it may under proper circumstances be used with other types. It is further obvious that various changes may be made in details within the scope of the appended claims, without departing from the spirit of this invention. It is, therefore, to be understood that this invention is not to be limited to the specific details shown and/or described.

Having thus described the invention, what is claimed is:

1. A trunk piston having a skirt formed to provide two pairs of diametrically disposed broad bands of contact with the cylinder walls extending the full length of the skirt, one pair of said bands being in line with the wrist pin axis, the portions of the skirt between said bands being relieved to clear the cylinder wall.

2. A trunk piston having a skirt formed to provide two pairs of diametrically disposed broad bands of contact with the cylinder walls extending substantially the full length of the skirt, said pairs being arranged on transverse diameters and the portions of the skirt between said bands being relieved to clear the cylinder wall.

3. A trunk piston having a skirt formed to provide two pairs of diametrically disposed broad bands of contact with the cylinder walls extending substantially the full length of the skirt, and relieved bands separating the said bands of contact and extending substantially the full length of said skirt.

4. A trunk piston having a skirt formed to provide two pairs of diametrically disposed broad bands of contact with the cylinder walls extending substantially the full length of the skirt, one pair of said bands being in line with the wrist pin axis, the other pair having a greater extent of contact at the open end of the skirt than at the head end, and the portions of the skirt between said bands being relieved to clear the cylinder wall.

5. A trunk piston having a head and a skirt formed to provide two pairs of diametrically disposed broad bands of contact with the cylinder walls extending substantially the full length of the skirt, said pairs being arranged on transverse diameters and the portions of the skirt between said bands being relieved to clear the cylinder wall, and means unaffected by temperature adapted to center the head in the cylinder.

In testimony whereof we affix our signatures this 29th day of January, 1929.

JOHN FLAMMANG.
PERCY L. BOWSER.